(12) United States Patent
Beckman et al.

(10) Patent No.: US 6,668,533 B2
(45) Date of Patent: Dec. 30, 2003

(54) REEL MOWER AND BEARING ASSEMBLY

(75) Inventors: Richard W. Beckman, Nashville, IN (US); Robert E. Kersey, Muncie, IN (US)

(73) Assignee: American Lawn Mower Co., Muncie, IN (US)

( * ) Notice: Subject to any disclaimer, the term of this patent is extended or adjusted under 35 U.S.C. 154(b) by 0 days.

(21) Appl. No.: 10/074,373

(22) Filed: Feb. 11, 2002

(65) Prior Publication Data

US 2002/0157370 A1 Oct. 31, 2002

Related U.S. Application Data

(60) Provisional application No. 60/286,496, filed on Apr. 26, 2001.

(51) Int. Cl.$^7$ ................................................ A01D 34/53
(52) U.S. Cl. ........................ 56/249; 384/518; 384/458; 384/558
(58) Field of Search ........................ 56/249, 7; 384/518, 384/458, 558, 497, 545, 538; 24/493, 492, 594.1

(56) References Cited

U.S. PATENT DOCUMENTS

| | | | | |
|---|---|---|---|---|
| 628,791 | A | * 7/1899 | Germaine | 384/545 |
| 2,005,502 | A | * 6/1935 | Lontz | 384/518 |
| 2,276,734 | A | * 3/1942 | Meredith | 384/497 |
| 3,578,829 | A | * 5/1971 | Hata et al. | 384/458 |
| 3,762,783 | A | * 10/1973 | Hay | 384/558 |
| 5,024,121 | A | * 6/1991 | Hsieh | 74/594.1 |
| 5,207,118 | A | * 5/1993 | Chen | 74/594.1 |
| 5,609,423 | A | * 3/1997 | Jurik et al. | 384/518 |

OTHER PUBLICATIONS

Southland Mower Company, Inc., Selma, Alabama, Manufacturers of Dixie Lawn Mowers, "Dixie SL3," Specification and Parts List. No date.
Jacobsen Mfg. Company, Racine, Wisconsin, "Jacobsen 16" All Steel Lawn Mower: Parts List and Instruction Book. No date.
Jacobsen Mfg. Company, Racine, Wisconsin, "Jacobsen 18" Handmower, Part List. No date.
American Lawn Mowers, "Certified Line of Lawn Mowers: Certified Mower Features," Specification Sheet. No date.
The Henley Lawn Mower Co., Richmond, Indiana "Genuine–Self–Adjusting Ball Bearings: With the Patented Controlling Steel Sleeve," p. 53. No date.
The F. & N. Lawn Mower Co., Richmond, Indiana, U.S.A., "Lawn Mowers: Important Points for Good Lawn Care." No date.
Dille and McGuire Mfg. Co., Richmond, Indiana, U.S.A., "D and M Lawn Mowers: Construction of Our Automatic Patented Ball–Bearing Device," p. 31. No date.
Dalglish Engineered Products, "Exclusive . . . ," Specification Sheet. No date.
"Repair List and Direction Sheet for Style No. 864–5 Lawn Mower." No date.
"The Fleet–Wheel," Specification Sheet. No date.
Maxwells Limited, St. Marys, Ontario, Canada, "Wizard and Scout," Specification Sheet. No date.
Western Auto Supply Company, "Westline Senior Lawn Mower: Instructions and How to Order Parts." No date.

* cited by examiner

Primary Examiner—Árpád Fabián Kovács
(74) Attorney, Agent, or Firm—Barnes & Thornburg

(57) ABSTRACT

A reel mower includes a bearing system having a spring that biases a plurality of ball bearings toward a cone. The cone is fixedly mounted on the reel shaft. The cone can be conically constructed, and used in combination with a washer that is fixedly attached to the reel shaft.

19 Claims, 4 Drawing Sheets

REEL MOWER AND BEARING ASSEMBLY

RELATED APPLICATION

The present application claims the benefit of U.S. Provisional Patent Application Serial No. 60/286,496, filed Apr. 26, 2001, the complete disclosure of which is hereby incorporated by reference.

BACKGROUND AND SUMMARY

The present invention relates to a mower, and particularly, to a reel mower. More particularly, the present invention relates to a reel bearing system for a reel mower.

Reel mowers are well known as an effective tool for cutting grass. A reel mower uses a rotational reel of radially and helically extending blades to direct grass to a cutting blade located on a lower portion of the reel mower. As the blades pass over the cutting blade, grass is severed between the reel blades and the cutting blade. The rotating motion of the reel relative to the frame is supported by a bearing system on each side of the mower, the bearing system being adapted for rapid rotational movement while providing for years of service.

According to an illustrative embodiment, a bearing system for a reel mower comprises a spring tending to bias a plurality of ball bearings toward a cone that is fixedly mounted on a reel shaft. The spring is positioned directly adjacent to and positioned within a bearing cup, and applies spring loaded pressure on ball bearings that are disposed between the spring and the fixed cone. In one embodiment, a washer is provided between the spring and the ball bearings. Illustratively, the cone can be designed to have a simple conical construction, and used in combination with another washer fixed on the reel shaft, the fixed washer providing a dust cover for the bearing system.

In an illustrative embodiment, a reel mower comprises a frame, a reel having a shaft with opposite ends, and a bearing system disposed between at least one end of the shaft and the frame. The bearing system includes a cone fixedly mounted on the shaft and a bearing cup fixed to the frame and opening toward the cone. The cone and the bearing cup are concentric, and the cone illustratively has a tapered surface facing the bearing cup. The bearing system further includes a plurality of ball bearings in contact with the tapered surface and the cup.

The bearing cup comprises an end wall and a cylindrical side wall, and the plurality of ball bearings is disposed for contact with the cylindrical side wall. The bearing system further comprises a biasing element, or spring, disposed between the bearing cup end wall and the plurality of ball bearings. In one embodiment, the biasing element has a smooth surface configured to contact the plurality of ball bearings. In another embodiment, a washer is disposed between the biasing element and the plurality of ball bearings to provide a smooth surface.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
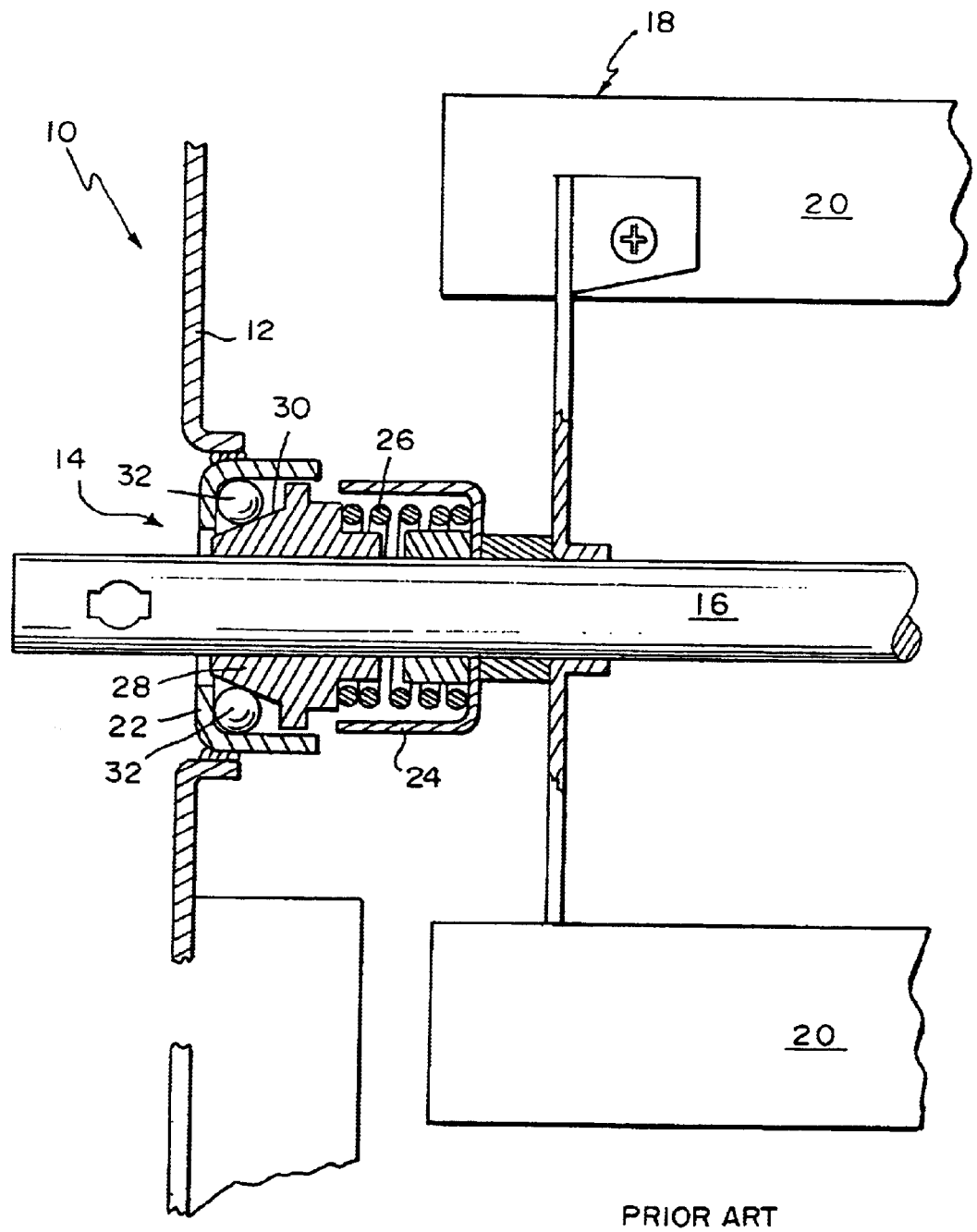
FIG. 1 is a front elevational view of a prior art frame, reel, and bearing system for a reel mower.

As shown in FIG. 1, a reel mower 10 comprises a frame 12 coupled with a bearing system 14, the bearing system 14 supporting reel shaft 16 for rotary movement. A reel 18 includes a plurality of blades 20 coupled with reel shaft 16 for rotary movement relative to frame 12. As blades 20 rotate relative to frame 12, grass is caught between blades 20 and a cutting blade (not shown), thereby cutting the grass.

Bearing system 14 of FIG. 1 is known in the art, and comprises a bearing cup 22 coupled with the frame 12 and a spring cup 24 coupled with the reel shaft 16. It should be understood that reel shaft 16 provides an axle for the pinion gear, which is connected to the wheels of the reel mower. Spring 26 is disposed within spring cup 24 and tends to bias a cone 28 axially outwardly toward bearing cup 22. Cone 28 includes a tapered surface 30 adapted to provide for positioning of a plurality of ball bearings 32 between bearing cup 22 and tapered surface 30 of cone 28. Cone 28 is slidably mounted on reel shaft 16, the sliding axial movement allowing for spring-loaded pressure to be exerted on ball bearings 32 by cone 28 in combination with spring 26.

Figure 2:
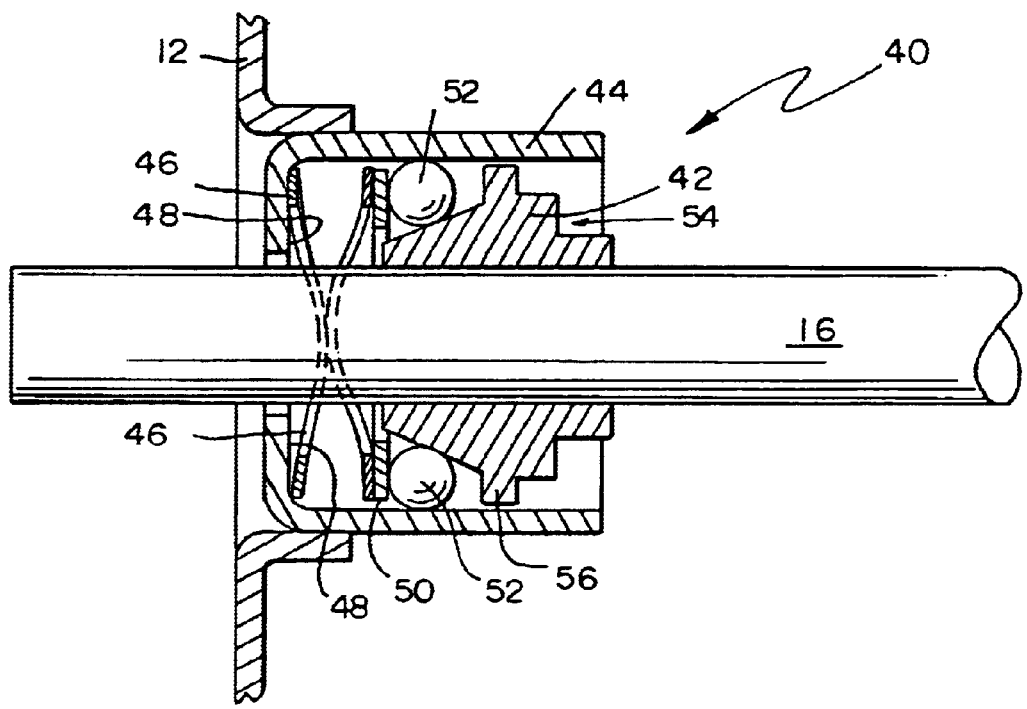
FIG. 2 is a view of one embodiment of the bearing system according to the present invention.

A bearing system 40 according to the present invention is shown in FIG. 2, wherein cone 42 is fixedly mounted on reel shaft 16, such as by press-fitting cone 42 on to reel shaft 16. However, it should be appreciated that other methods of mounting the cone on the reel shaft 16 are within the scope of this disclosure, including the use of adhesive, welding, or soldering.

In one embodiment, as shown in FIG. 2, cone 42 is designed similarly to cone 28 of FIG. 1, with the exception that cone 42 is adapted to be fixedly mounted on the reel shaft 16, thereby allowing cone 42 to maintain its position relative to reel shaft 16 throughout the grinding process associated with reel 18. Additionally, by fixedly mounting cone 42 to reel shaft 16, the variable of clearance between slip-fit cone 28 and reel shaft 16 of FIG. 1 is eliminated. Furthermore, a radially moving cone such as cone 28 can result in an altered concentricity for reel 18 after machining and grinding.

The components of bearing system 40 are arranged substantially as follows. Bearing cup 44 is fixedly coupled with frame 12, as shown in FIG. 2. Spring 46 is positioned such that it engages the axially inward surface 48 of the bearing cup 44. Spring 46 may comprise any suitable spring known in the art, however, a flat wire compression spring such as that sold by the Smalley Steel Ring Company of Wheeling, Ill. as Part No. C062 is shown in FIG. 2.

In FIG. 2, washer 50 is positioned adjacent to spring 46 on the axially inward (toward the right in FIG. 2) side of the spring 46. However, it is within the scope of the invention to use a spring having squared-shim ends, such as Part No. CS062, manufactured by the Smalley Steel Ring Company, thereby eliminating the need for washer 50. Such a configuration can be seen in FIG. 4, where ball bearings 52 are disposed directly adjacent squared-shim end spring 46'. Thus, it should be understood that the each of the embodiments shown in FIGS. 2 and 4 can be configured to have ball bearings 52 disposed between cone 42 and washer 50, or between cone 42 and the spring if the spring includes squared-shim ends.

It should be understood that other materials and constructions may be substituted for the springs used to bias the ball bearings toward the cone. For example, a rubber-like material, a foam material, or an encapsulated air material may be used in place of the spring in order to bias the ball bearings toward the cone, as well as any other material or construction of materials capable of biasing in such a manner.

Figure 3:
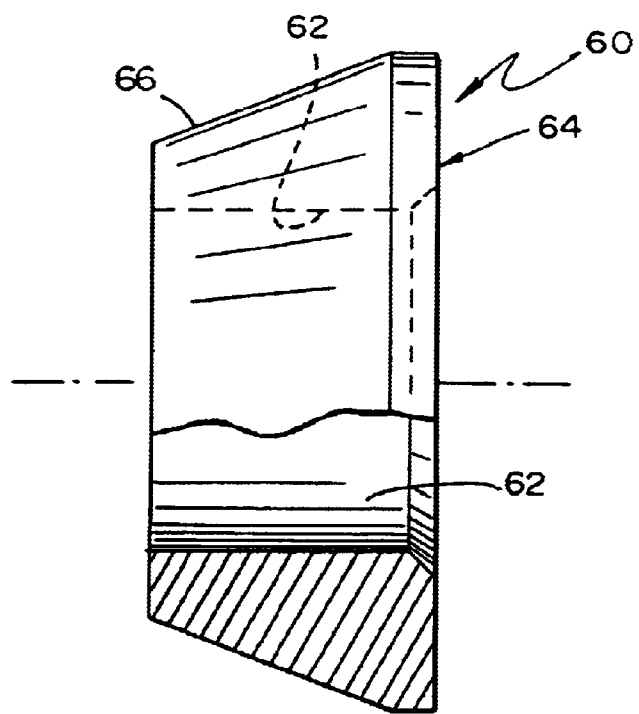
FIG. 3 is a view of a second embodiment of the cone associated with the bearing system.

FIG. 3 shows an alternative embodiment of the cone, wherein cone 60 comprises a central bore 62, a flat-surfaced end 64, and a tapered surface 66. Flat-surfaced end 64 replaces the stepped end 54 of cone 42 (shown in FIG. 2), which is rendered unnecessary by the arrangement of bearing system elements according to the illustrative embodiment. Additionally, flange 56 of cone 42 (shown in FIG. 2) can be easily replaced with a mounted washer 68, as shown in FIG. 4, thereby simplifying the machining of cone 60.

Figure 4:
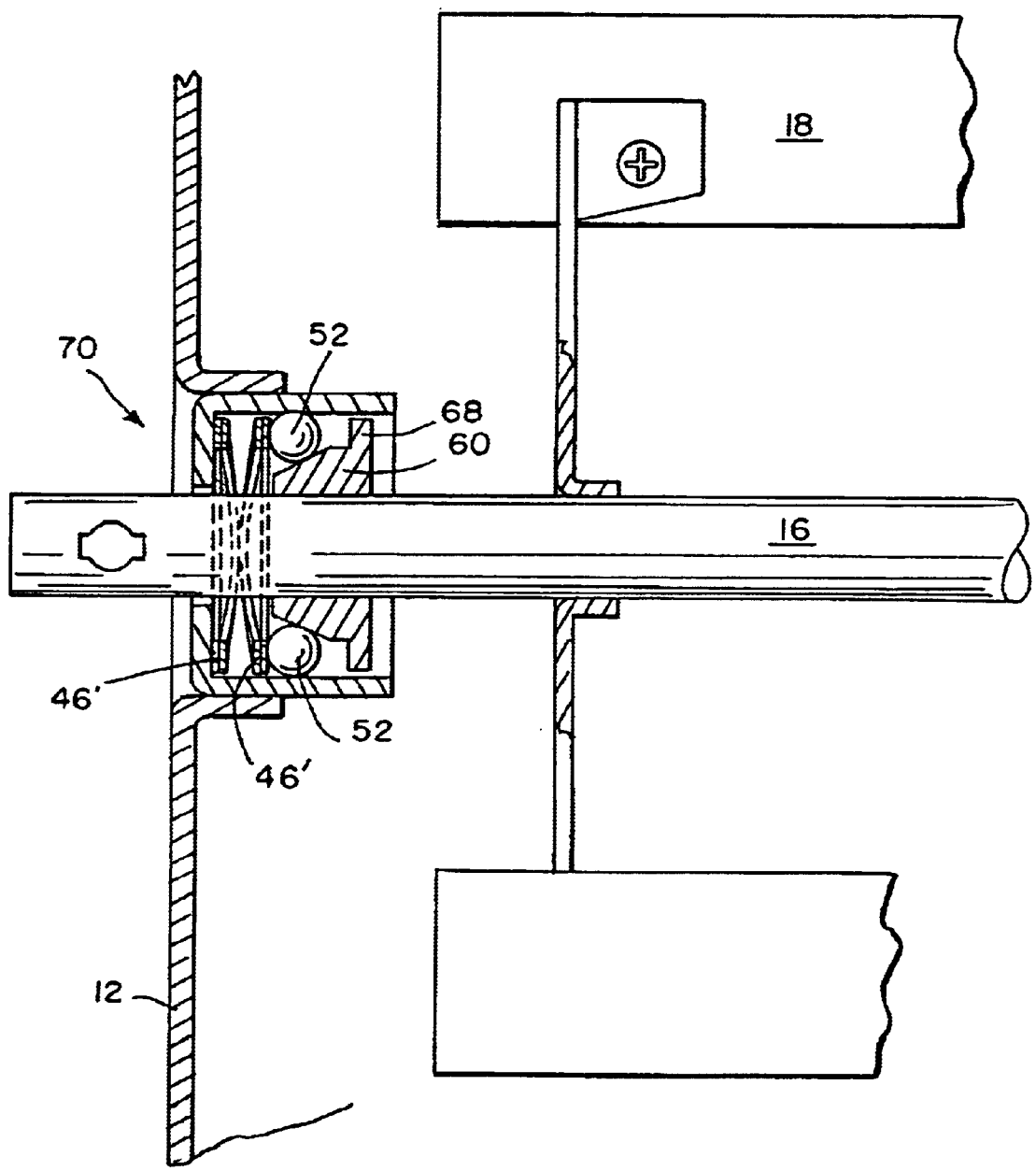
FIG. 4 is a view of the cone of FIG. 3 as used in the illustrative bearing system.

The alternative embodiment of cone 60 can be seen incorporated with bearing system 70 in FIG. 4. Similar in construction to bearing system 40 of FIG. 2, bearing system 70 comprises (squared-shim end) spring 46' (or in the alternative, a spring and a washer 50, as discussed above). Ball bearings 52 are disposed between spring 46' and cone 60. Cone 60 and mounted washer 68 are both fixedly mounted to shaft 16, for example, by press fitting. Mounted washer 68 is advantageously an easily manufactured flat washer, which provides a dust cover for bearing system 70.

Figure 5:
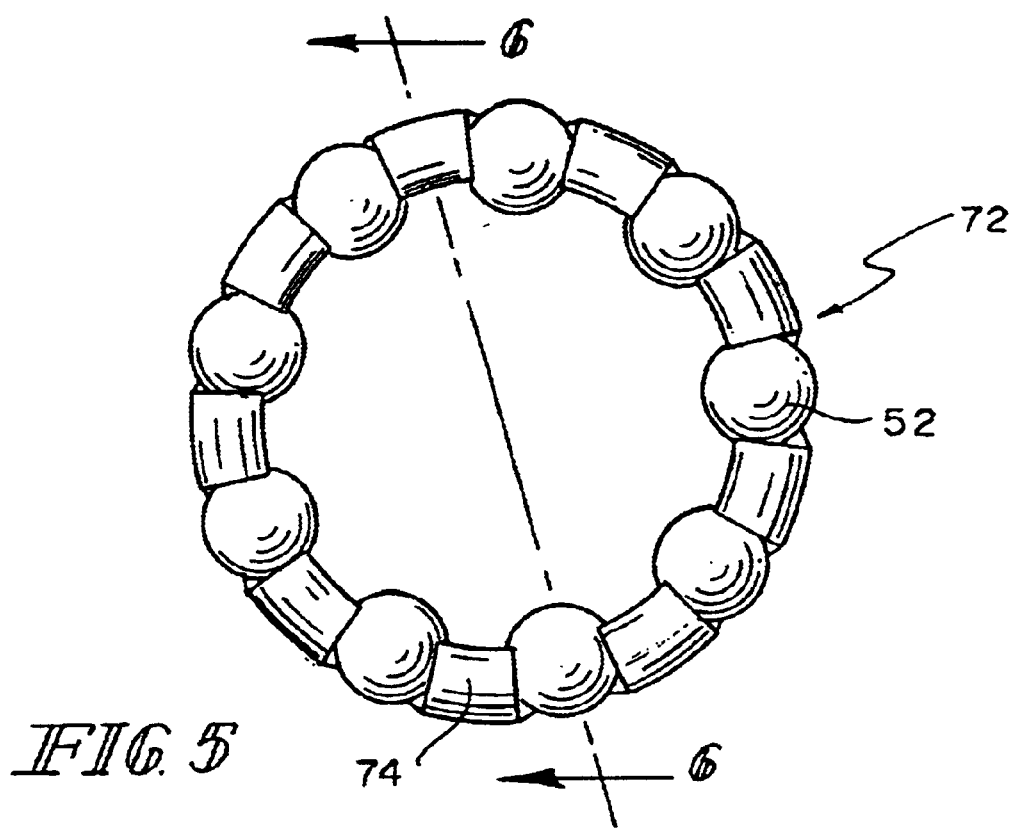
FIG. 5 is a front view of a ball retainer with ball bearings included, the ball retainer and housed ball bearings being capable of substitution in the illustrated embodiments in place of the ball bearings.
Figure 6:
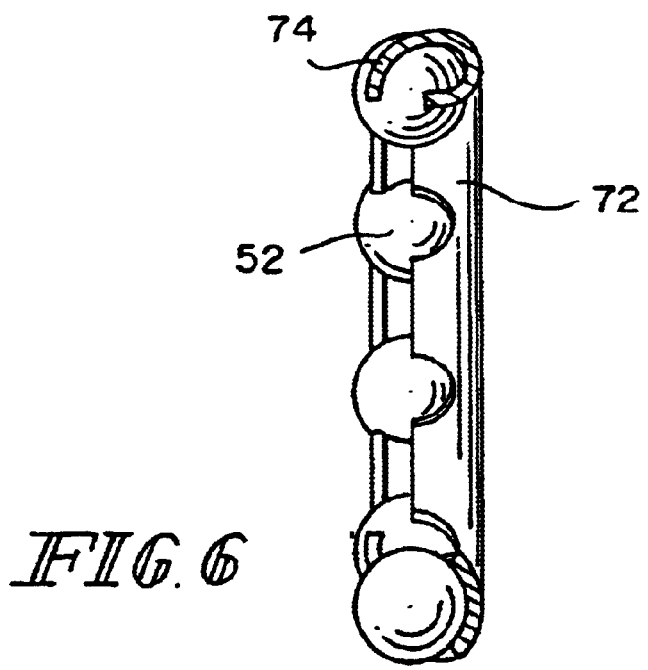
FIG. 6 is a cross sectional view of the ball retainer of FIG. 5, taken along the line 6—6.

It should be understood that ball bearings 52 (of FIGS. 2 and 4) can be housed in a ball-retainer 72, as shown in FIGS. 5 and 6. Ball retainer 72 is known in the art, and comprises a ring having radially extending spokes 74 that are curved to withhold ball bearings 52 in a circular arrangement as shown. In the illustrated embodiments, ball retainer 72 in combination with ball bearings 52 can be substituted where ball bearings 52 are disclosed, thereby preventing potential scattering of ball bearings 52 when bearing system 40 or bearing system 70 is serviced.

It should also be understood that the disclosure contemplates a method of constructing a bearing for a reel mower. The method comprises the steps of providing a shaft, press-fitting a cone on the shaft, providing a frame having a bearing cup, positioning a spring in the bearing cup, positioning a plurality of ball bearings adjacent the spring, and fitting the cone-bearing shaft in the bearing cup such that the cone is positioned adjacent the plurality of ball bearings and the plurality of ball bearings is biased by the spring toward the cone. The method can further include the step of press-fitting a washer on the shaft before press-fitting the cone on the shaft. The method could also include the step of forming the spring to include a smooth surface, such that the ball bearings are disposed adjacent the smooth surface. Additionally, the method could include the step of positioning a washer between the spring and the plurality of ball bearings. In such a method, the bearing cup includes an end wall and a cylindrical side wall, and the plurality of ball bearings contacts the cylindrical side wall, but is prevented from contacting the end wall.

Although the invention has been described in detail with reference to preferred embodiments, additional variations and modifications exist within the scope and spirit of the invention as described and defined in the following claims.

We claim:

1. A reel mower comprising a frame, a reel having a shaft with opposite ends, and a bearing system disposed between at least one end of the shaft and the frame, the bearing system comprising a cone fixedly mounted on the shaft so as to prohibit rotational and axial movement on the shaft and a bearing cup fixed to the frame and opening toward the cone, the cone and the cup being concentric, the cone having a tapered surface facing the bearing cup, and a plurality of ball bearings in contact with the tapered surface and the cup.

2. The reel mower of claim 1, wherein the bearing cup comprises an end wall and a cylindrical side wall, and the plurality of ball bearings is disposed for contact with the cylindrical side wall.

3. The reel mower of claim 1, wherein the bearing system further comprises a biasing element disposed between the bearing cup end wall and the plurality of ball bearings.

4. The reel mower of claim 3, wherein the biasing element is a spring.

5. The reel mower of claim 4, wherein the biasing element has a smooth surface configured to contact the plurality of ball bearings.

6. The reel mower of claim 3, wherein the bearing system further comprises a washer disposed between the biasing element and the plurality of ball bearings.

7. A reel mower comprising a frame, a reel rotatably coupled to the frame, the reel having a central shaft with opposite ends, and a bearing configured to support the reel for rotatable movement relative to the frame, the bearing comprising a cone fixedly mounted on the shaft so as to prohibit rotational and axial movement on the shaft, a bearing cup fixed to the frame and configured to concentrically receive one end of the shaft and the cone, a plurality of ball bearings disposed between the bearing cup and the cone, and a spring disposed between the bearing cup and the ball bearings and configured to bias the ball bearings toward the cone.

8. The reel mower of claim 7, wherein the bearing cup includes an end wall and a cylindrical side wall, and the bearing is configured such that the plurality of ball bearings contacts the cylindrical side wall, but is prevented from contacting the end wall.

9. The reel mower of claim 7, wherein the spring has a smooth surface configured to contact the plurality of ball bearings.

10. The reel mower of claim 7, further comprising a washer disposed between the spring and the plurality of ball bearings.

11. The reel mower of claim 7, wherein the spring does not contact the cone.

12. The reel mower of claim 7, wherein the cone is press-fit on the shaft.

13. The reel mower of claim 7, wherein the bearing cup has an open end and the cone has a tapered surface, the tapered surface facing the open end of the bearing cup.

14. The reel mower of claim 7, further comprising a washer fixedly mounted on the shaft adjacent the cone, the washer being positioned axially inwardly from the cone relative to the shaft end.

15. A method of constructing a bearing, comprising the steps of providing a shaft, press-fitting a cone on the shaft such that the cone is prohibited from rotationally and axially movement relative to the shaft, providing a frame having a bearing cup, positioning a spring in the bearing cup, positioning a plurality of ball bearings adjacent the spring, and fitting the cone-bearing shaft in the bearing cup such that the cone is positioned adjacent the plurality of ball bearings and the plurality of ball bearings is biased by the spring toward the cone.

16. The method of claim 15, further comprising the step of press-fitting a washer on the shaft before press-fitting the cone on the shaft.

17. The method of claim 15, wherein the spring is formed to include a smooth surface, such that the ball bearings are disposed adjacent the smooth surface.

18. The method of claim 15, further comprising the step of positioning a washer between the spring and the plurality of ball bearings.

19. The method of claim 15, wherein the bearing cup includes an end wall and a cylindrical side wall, and the plurality of ball bearings contacts the cylindrical side wall, but is prevented from contacting the end wall.

* * * * *